WOODWARD & SMITH.
Wheel.

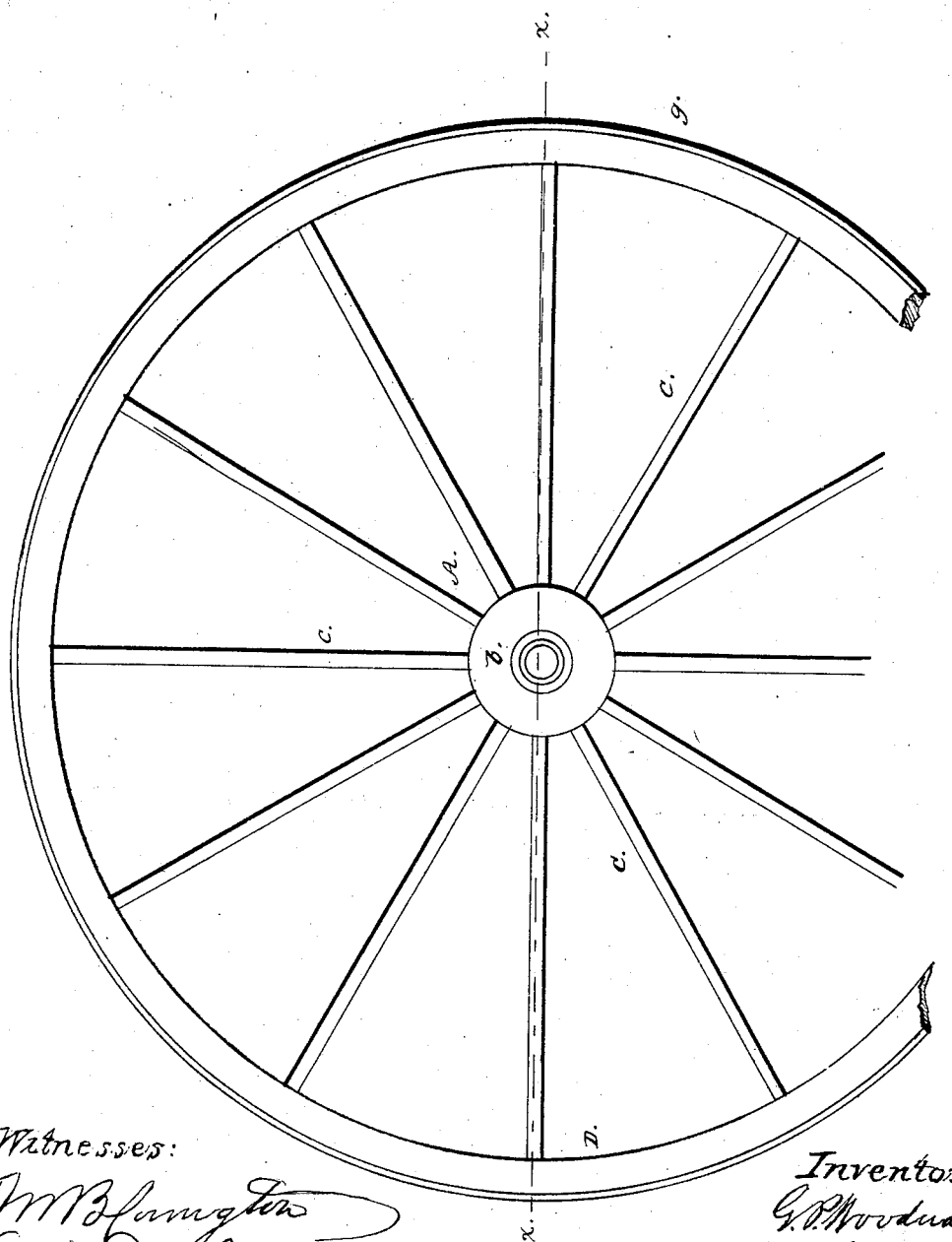

No. 56,315.

2 Sheets—Sheet 2.

Patented July 10, 1866.

Witnesses:

Inventor:

UNITED STATES PATENT OFFICE.

G. B. WOODARD, OF BOLIVAR, AND M. L. SMITH, OF SCIO, NEW YORK.

IMPROVEMENT IN WHEELS FOR VEHICLES.

Specification forming part of Letters Patent No. 56,315, dated July 10, 1866.

*To all whom it may concern:*

Be it known that we, G. B. WOODARD, of Bolivar, in the county of Allegany and State of New York, and M. L. SMITH, of Scio, in the county of Allegany and State of New York, have invented a new and useful Improvement in Wheels for Vehicles; and we do hereby declare that the following is a full, clear, and exact description thereof, which will enable those skilled in the art to make and use the same, reference being had to the accompanying drawings, forming part of this specification, in which—

Figure 5:
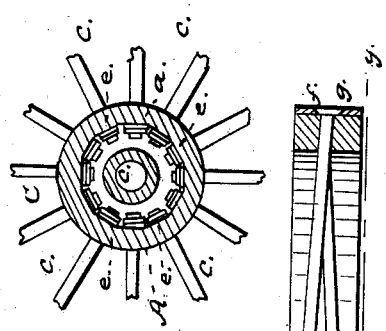
Figure 2:
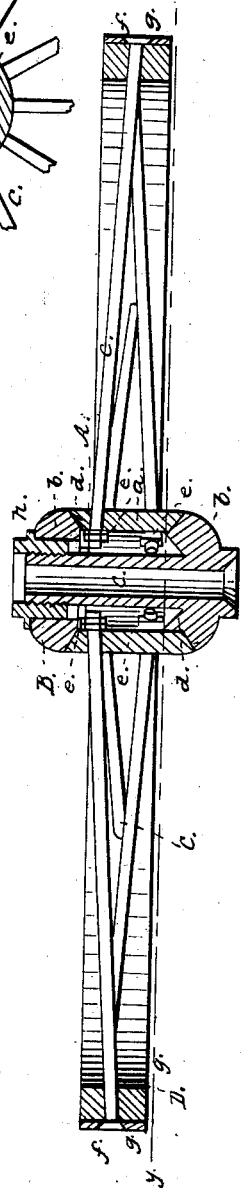

Figure 1 is a side or face view of our invention; Fig. 2, a section of the same, taken in the line $x\,x$, Fig. 1; Fig. 3, a section of hub of the same, taken in the line $y\,y$, Fig. 2.

Similar letters of reference indicate corresponding parts.

This invention relates to a new and useful improvement in the construction of wheels for vehicles; and it consists in the employment or use of a metallic hub and spokes and wooden fellies constructed and arranged in such a manner that a very light, strong, and durable wheel is obtained, and one which may be constructed at a moderate cost.

A represents the hub of the wheel, constructed of cast metal and of three parts, $a\,b\,b'$, with a box, $c$, which is connected or cast with the part $b$.

The part $a$ is the central portion of the hub, which externally is of cylindrical form, and of polygonal form internally, as shown in Fig. 3. The parts $b\,b'$ are the end pieces of the hub, one of which, $b$, is cast with the box $c$, which is fitted and works upon the arm of the axle. These two end pieces, $b\,b'$, are of rounded form to give a finish to the hub, and they abut against the ends of the central part, $a$, with a miter-joint, and have flanges $d$, which project within the hub a short distance, as shown in Fig. 2. The use of these flanges will presently be shown.

The box $c$ extends entirely through the hub, and has a screw-thread cut on its outer end externally to receive a nut, B, the end piece, $b'$, having an opening of sufficient diameter to allow the box $c$ to pass through it and also to receive the nut B when screwed on the box, as will be fully understood by referring to Fig. 2.

C represents the spokes of the wheel, the inner ends of which have screw-threads upon them and pass through the part $a$ of the hub, and have nuts $e$ on them within the hub, said nuts bearing against the inner plane surfaces of the part $a$. These nuts are prevented from unscrewing by the flanges $d$ of the end pieces, $b\,b'$, which are in contact with them, the spokes having an inclined position and passing through the part $a$ of the hub near the end pieces, $b\,b'$, the spokes being inclined alternately in opposite directions. The outer ends of the spokes are provided with heads $f$, and the spokes pass through the tire $g$ and felly D of the wheel, and are screwed up taut by means of the nuts $e$.

The nut B is provided with a flange, $h$, which bears against the end piece, $b'$, and keeps the parts of the hub together, each end piece being provided with a lip, $i$, which fits in recesses in the ends of $a$ and prevents the end pieces from turning when said nut B is screwed up.

The spokes C may be constructed of iron or steel, and painted or galvanized, or both.

By this mode of construction we obtain a very light, strong, and economical wheel, one which may be very readily taken apart when necessary for repairing, &c.

Having thus described our invention, we claim as new and desire to secure by Letters Patent—

1. The combination of the box C, cast with the end piece, $b$, central piece, $a$, end piece, $b'$, and nut B, both end pieces being provided with a flange, $d$, all constructed and operating in the manner and for the purpose herein specified.

2. The spokes C, secured to the fellies and part $a$ of the hub, as shown, when used in combination with the flanges $d$, at the inner ends of the parts $b\,b'$, substantially as and for the purpose specified.

G. B. WOODARD.
M. L. SMITH.

Witnesses:
F. G. BABCOCK,
I. H. CLARK.